United States Patent
Ohwaki et al.

(10) Patent No.: US 8,668,985 B2
(45) Date of Patent: *Mar. 11, 2014

(54) ALUMINUM ALLOY MATERIAL HAVING AN EXCELLENT SEA WATER CORROSION RESISTANCE AND PLATE HEAT EXCHANGER

(75) Inventors: Takeshi Ohwaki, Kobe (JP); Wataru Urushihara, Kobe (JP); Junichiro Kinugasa, Kobe (JP); Koji Noishiki, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 871 days.

This patent is subject to a terminal disclaimer.

(21) Appl. No.: 12/174,892

(22) Filed: Jul. 17, 2008

(65) Prior Publication Data

US 2009/0081449 A1 Mar. 26, 2009

(30) Foreign Application Priority Data

Sep. 20, 2007 (JP) ................................. 2007-244119
Jan. 23, 2008 (JP) ................................. 2008-012895

(51) Int. Cl.
*F28F 3/00* (2006.01)
*F28F 19/02* (2006.01)
*B32B 17/00* (2006.01)
*B32B 27/00* (2006.01)

(52) U.S. Cl.
USPC ............ 428/334; 165/133; 165/166; 428/421

(58) Field of Classification Search
USPC ........................ 428/334, 421; 165/133, 166
See application file for complete search history.

(56) References Cited

U.S. PATENT DOCUMENTS

| | | | | |
|---|---|---|---|---|
| 4,931,505 A | * | 6/1990 | Miyazaki et al. | 525/125 |
| 5,377,901 A | * | 1/1995 | Rungta et al. | 228/183 |
| 5,463,804 A | * | 11/1995 | McCleary et al. | 29/469.5 |
| 5,532,304 A | * | 7/1996 | Miyazaki et al. | 524/261 |
| 6,242,054 B1 | | 6/2001 | Baalmann et al. | |
| 6,338,876 B1 | | 1/2002 | Ishii et al. | |

(Continued)

FOREIGN PATENT DOCUMENTS

| | | |
|---|---|---|
| JP | 2000-283695 | 10/2000 |
| JP | 2002120002 | * 4/2002 |

(Continued)

OTHER PUBLICATIONS

Machine translation of JP2004-068032 (2004).*

(Continued)

*Primary Examiner* — Callie Shosho
*Assistant Examiner* — Samir Shah
(74) *Attorney, Agent, or Firm* — Oblon, Spivak, McClelland, Maier & Neustadt, L.L.P.

(57) ABSTRACT

An aluminum alloy material having an excellent sea water corrosion resistance comprises an aluminum alloy substrate whose ten-points average surface roughness Rz, which is the average of five greatest peak-to-valley separations on the surface, is controlled at 0.3 μm or over, an organic phosphonic primer film formed on a surface of the aluminum alloy substrate, and a fluorine resin paint film formed on the primer film and having a dry average thickness of 1 to 100 μm. A plate heat exchanger having an excellent sea water corrosion resistance is also provided wherein the aluminum alloy material is used as a heat transfer unit using sea water as cooling water.

10 Claims, 1 Drawing Sheet

(56) References Cited

U.S. PATENT DOCUMENTS

| | | |
|---|---|---|
| 2003/0035970 A1 | 2/2003 | Wada et al. |
| 2004/0251008 A1* | 12/2004 | O'Neill et al. ................ 165/166 |
| 2008/0283228 A1* | 11/2008 | Ohwaki et al. ................ 165/151 |

FOREIGN PATENT DOCUMENTS

| | | | |
|---|---|---|---|
| JP | 2003-88748 | | 3/2003 |
| JP | 2004-42482 | | 2/2004 |
| JP | 2004068032 | * | 3/2004 |
| JP | 2006-169561 | | 6/2006 |

OTHER PUBLICATIONS

Machine translation of JP2002-120002 (2002).*

U.S. Appl. No. 11/852,721, filed Sep. 10, 2007, Ohwaki, et al.

U.S. Appl. No. 12/469,225, filed May 20, 2009, Ohwaki et al.

Akihiro Oyabuki, et al. "Self-repairing capability of anticorrosive coating for aluminum alloys", Proceedings of JSCE Materials and Environments, 2004, pp. 415-418 (With English Translation).

* cited by examiner

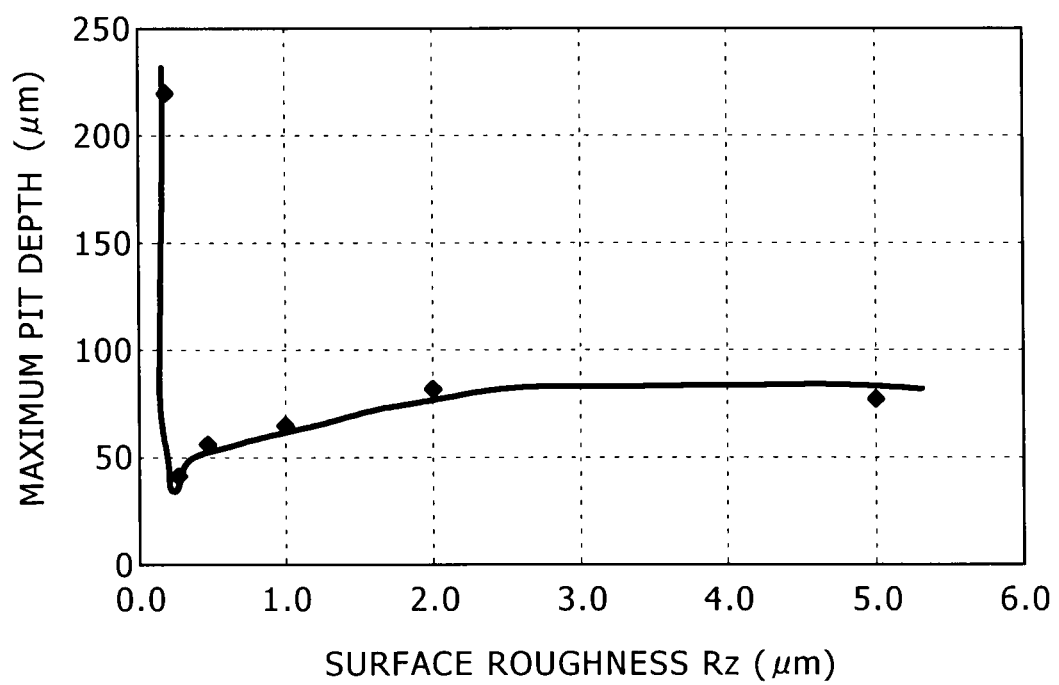

ALUMINUM ALLOY MATERIAL HAVING AN EXCELLENT SEA WATER CORROSION RESISTANCE AND PLATE HEAT EXCHANGER

BACKGROUND OF THE INVENTION

1. Field of the Invention

This invention relates to an aluminum alloy material having an excellent sea water corrosion resistance and a plate heat exchanger using the alloy material in or as a heat transfer unit making use of sea water as cooling water.

2. Description of the Related Art

Aluminum alloys have high specific strength and high heat conductivity, for which they have been widely used as a material for small-sized, lightweight heat exchangers. Typical of heat exchangers using an aluminum alloy material are fin and tube heat exchangers employed in domestic air conditioners, automotive radiators and the like. In contrast, industrial plate heat exchanger using sea water as cooling water make use generally of titanium and thus, the use of more economic aluminum alloys has been under investigation.

Such a plate heat exchanger having a heat transfer unit where sea water is provided as cooling water is exposed to a severe corrosion environment when used in a sea water environment. This is because highly corrosion-resistant titanium has now been in use. An aluminum alloy material has a high corrosion resistance on its own. Nevertheless, if an aluminum alloy is used in such a plate heat exchange in place of titanium, a further adequate anticorrosive measure has to be taken.

In general, for an anticorrosive measure of an aluminum alloy material for such a type of plate heat exchange, there is used, aside from the formation of an anodized oxide film, means such as of electrolytic protection, coating film formation using paints and the like. With the case of application to heat exchangers, means of adding inhibitors to cooling water is used.

However, plate heat exchangers are of a transient type, meaning that cooling water is discharged to outside of a system after passage through an apparatus and thus, cooling water is not used by circulation. Thus, an anticorrosive measure using an inhibitor is not proper, but an anticorrosive measure using paint film formation is economically appropriate.

On the other hand, various types of coating films on an aluminum alloy material for heat exchanger have been proposed including inorganic coating films, organic coating films, organic-inorganic hybrid coating films and have now been actually employed. Coating film formation means for heat exchangers have been proposed, for example, in Japanese Laid-open Patent Application Nos. 2003-88748 and 2004-42482 (which may be sometimes referred hereinafter to as Patent Literatures 1 and 2, respectively).

Patent Literature 1 refers to the formation of a polyaniline film wherein the film is not applied to plate heat exchangers using seat water, to which the present invention is directed, but is applied to an aluminum alloy material for fin and tube heat exchangers used in domestic air conditioners, automotive radiators and the like.

Patent Literature 2 discloses the formation of a coating film with improved adhesion wherein there is used, as a composite primer layer, a coating film that is obtained by subjecting, to boehmite treatment or silicate treatment, an aluminum alloy material for fin and tube heat exchangers, like Patent Literature 1, used in domestic air conditioners and automotive radiators. Moreover, in "Proceedings for Meeting for Zairyo-to-Kankyo, Self-repairing Property of Anticorrosive Coatings for Aluminium Alloys" written by Akihiro Yabuki, Hiroyoshi Yamagami, Takeshi Oowaki, Kiyomi Adachi and Koji Noishiki, p. 3-4 (2004) (which may be referred to hereinafter as Non-patent Literature 1), it is disclosed that when used as an anticorrosive coating film for a transient type of heat exchanger, a trifluoride resin exhibits self-repairability.

In Japanese Laid-open Patent Application No. 2006-169561 (which may be referred to hereinafter as Patent Literature 3), there has been proposed, as an improvement of trifluoride protective coating, a self-repairing aluminum alloy protective coating which is made of a trifluoride resin containing 0.1 to 10 vol % of at least one member selected from zinc, titanium, manganese, aluminum and niobium. This is a measure for the fact that with a heat exchanger using sea water as a cooling medium, the surface of the heat exchanger is liable to be damaged, with the tendency that when surface damage is once induced, the damage is abruptly enlarged by a vigorous corrosive action with sea water. More particularly, it is stated that the trifluoride resin anticorrosive coating film containing a powder of the above-mentioned metal has self-repairability when the coating suffers damage.

The coating film of Patent Literature 1 is sufficient for an improvement in corrosion resistance of fin and tube heat exchangers used for domestic air conditioners and automotive radiators. However, when used in plate heat exchangers using sea water, to which the invention is directed, such a coating film is unsatisfactory with respect to the corrosion resistance in a saline environment such as of sea water.

In contrast, the trifluoride resin anticorrosive coating films of Patent Literature 3 and the report made by Akihiro Yabuki et al have, in their own nature, a more excellent corrosion resistance to sea water than the coating film of Patent Literature 1 and other types of anticorrosive films such as an anodized film and other types of coating films. However, when applied to a plate heat exchanger using sea water, to which the invention is directed, there arises a problem in that they degrade in adhesion (adhesion durability) to aluminum alloy materials in long-term use and are not thus reliable.

The degradation problem of adhesion (adhesion durability) to aluminum alloy materials in long use likewise occurs in primer or underlying treatment that is directed to heat exchangers used in domestic air conditioners and automotive radiators such as of Patent Literature 2.

More particularly, the fin and tube heat exchangers used in the air conditioners and automotive radiators have the life of at most ten and several years, and a required life of corrosion resistance is such a relatively short time as just mentioned. In this connection, however, plate heat exchangers using sea water as cooling water, such as a vaporizer for natural liquefied gas, are industrially employed in plants and are of a large-scale equipment and thus expensive. Accordingly, it is required that the life and durability life of the heat exchanger be a semipermanent life of not less than several tens of years.

The corrosion resistance of such long life-oriented plate heat exchangers using sea water as cooling water is predominant of adhesion of a coating film to an aluminum alloy material rather than a corrosion resistance of the coating film itself. This is because if the coating film comes off in use, it is meaningless no matter how excellent a corrosion resistance of the film is. In other words, it would not be an overstatement to say that the corrosion resistance, such as a sea water corrosion resistance, of the long life-oriented plate heat exchanger using sea water as cooling water is an adhesion of a coating film to an aluminum alloy material. Such an adhesion of a coating film is impeded owing to the swelling of a coating film with a corrosive fluid such as seat water or the like.

In this regard, the anticorrosive method of directly providing a trifluoride resin anticorrosive coating film on a surface of aluminum alloy material as in the Patent Literature 1 and the Non-patent Literature 3 has a practical problem in that an adhesion to aluminum alloy materials is poor, and a corrosion resistance under use of sea water cannot be improved in a substantial way.

SUMMARY OF THE INVENTION

Under these circumstances, it is an object of the invention to provide an aluminum alloy material having an excellent adhesion (i.e. corrosion resistance to sea water) thereto of a trifluoride resin anticorrosive coating film, i.e. an aluminum alloy material having an excellent peel resistance of the coating film.

It is another object of the invention to provide a plate heat exchanger using the above-mentioned aluminum alloy material in a heat transfer unit using sea water as cooling water.

In order to achieve the above objects, there is provided, according to one embodiment of the invention, an aluminum alloy material having an excellent sea water corrosion resistance, which comprises an aluminum alloy substrate whose ten-points average surface roughness Rz is controlled at 0.3 µm or over, an organic phosphonic acid primer film formed on a surface of the alloy substrate, and a fluorine resin paint film formed on the primer film and having a dry average thickness of 1 to 100 µm.

Preferably, the ten-points average surface roughness Rz is controlled at 1.0 µm or over.

Preferably, a fluorine resin for the fluorine resin paint film is made of a trifluoride resin.

It is also preferred that the fluorine resin of the fluorine resin paint film is made of a trifluoride resin. More specifically, the trifluoride resin consists of a chlorotrifluoroethylene/vinyl ether copolymer and the fluorine resin paint film is one which comprises the chlorotrifluoroethylene/vinyl ether copolymer crosslinked with an isocyanate.

It is preferred that the aluminum alloy substrate is made of an aluminum alloy 3000 series defined in JIS or AA standards.

According to another embodiment of the invention, there is provided a plate heat exchanger, which comprises a heat transfer unit using sea water as cooling water, the heat transfer unit being constituted of an aluminum alloy material defined in the first embodiment.

The aluminum alloy material having an excellent sea water corrosion resistance according to one embodiment of the invention includes an aluminum alloy substrate whose ten-points average surface roughness Rz is controlled at 0.3 µm or over, an organic phosphonic acid primer film formed on a surface of the alloy substrate, and a fluoride resin paint film having an average thickness of 1 to 100 µm after drying and is thus enabled to suppress the paint film from coming off owing to the swelling thereof. Eventually, the resulting aluminum alloy material is excellent in a resistance to sea water corrosion.

In this connection, it is general that where an aluminum alloy material is coated, a underlying or primer treatment for enhancing adhesion to a film is carried out. Conventional primer treatments include chemical film treatments such as a chromate treatment, an inorganic phosphate treatment and a boehmite treatment, and a porous anodization treatment. As stated hereinabove, in the Patent Literature 2, it is disclosed to use, a composite primer coat, a film formed by boehmite treatment, a film formed by silicate treatment and the like for application to aluminum alloy materials for fin and tube heat exchangers used as domestic air conditioners, automotive radiators and the like.

According to our knowledge, the primer coats formed by the chemical film treatment or porous anodization treatment other than the organic phosphonic treatment have no practical effect of improving adhesion (sea water corrosion resistance) of a fluorine resin paint film to an aluminum alloy material in a saline environment such as of sea water. The term "no practical effect" embraces the case where a little more improving effect of adhesion is recognized than in the case of adhesion where a fluorine resin paint film is formed directly on a surface of an aluminum alloy material.

On the other hand, when the ten-points average surface roughness Rz of the aluminum alloy substrate is controlled at 1.0 µm or over, not only pitting corrosion is inhibited, but also durability under high temperature immersion (evaluation of a residual rate of coating film made by a cross cut tape peeling test) is improved.

According further to our knowledge, most of phosphate treatments including a phosphoric acid treatment, phosphate treatments such as of inorganic phosphoric acid, zinc phosphate and the like and other types of organic phosphoric acids have no effect of improving practical adhesion of a trifluoride resin anticorrosive coating film to an aluminum alloy material. Only an organic phosphonic acid primer film exhibits an effect of improving practical adhesion (sea water corrosion resistance) of a trifluoride resin anticorrosive coating film to an aluminum alloy material.

Like a difference in effect with other kinds of general-purpose coating primer treatments, a significant difference depending on the type of phosphate is based on affinity for or adhesion to an oxide film on the surface of an aluminum alloy material, which results from a characteristic molecular structure of the organic phosphonic acid used in the invention as will be detailed hereinafter.

In this sense, when a trifluoride resin is used as the fluorine resin of the fluorine resin paint film, the affinity for or adhesion to the oxide film on the surface of the aluminum alloy material is improved owing to the specific molecular structure of the organic phosphonic acid.

Further, since the fluoride resin is preferably made of a chlorotrifluoroethylene/vinyl ether copolymer and the fluorine resin paint is one wherein the chlorotrifluoroethylene/vinyl ether copolymer is crosslinked with an isocyanate, this is preferred from the standpoint that the highest adhesion with the primer film of an organic phosphonic acid is ensured and a high sea water corrosion resistance is attained.

Still further, the aluminum alloy substrate is made of 3000 series defined in JIS or AA standards, so that this material is likely to be processed or shaped into a plate or fin for plate heat exchangers, with good brazing properties.

The plate heat exchanger according to another embodiment of the invention makes use of an aluminum alloy material defined in the first embodiment as a heat transfer unit using sea water as cooling water. Thus, there can be obtained a plate heat exchanger whose adhesion (sea water corrosion resistance) of a fluorine resin paint film (anticorrosive coating film) to the aluminum ally material is good.

BRIEF DESCRIPTION OF THE DRAWING

The sole FIGURE is a graph showing a maximum pit depth relative to the variation in average surface roughness Rz.

DETAILED DESCRIPTION OF THE PREFERRED EMBODIMENTS

Embodiments of the invention are now described.
(Roughness Control)

It is preferred from the standpoint of improving adhesion with an primer film set out below that the aluminum alloy substrate of the invention has a ten-points average surface roughness Rz controlled at 0.3 μm or over. Moreover, it is also preferred from the standpoint of improving durability under high temperature immersion conditions to control a ten-points average surface roughness at 1.0 μm or over.

The term "ten-points average surface roughness" is defined as follows: only a reference length is picked out of a surface roughness curve of an aluminum alloy along a direction of average line to determine, as a ten-points average surface roughness, a sum of an average absolute value of peaks including from the highest peak to the fifth peak in the average line of the picked portion and an average absolute value of valleys including from the lowest valley to the fifth valley. Such a roughness control can be achieved by a surface treatment such as a dry blast process wherein an abrasive material is jetted against a surface to be treated by means of compressed air, or a wet blast process wherein an abrasive material and a fluid are jetted against a surface to be treated.

(Organic Phosphonic Acid Primer Film)

In the practice of the invention, in order to improve adhesion between an after-described fluorine resin paint film (anticorrosive coating film) that is able to improve a corrosion resistance under use of sea water and the aluminum alloy substrate, a primer film of an organic phosphonic acid selected from phosphoric acid compounds is used as an undercoat (treatment) for a fluorine resin paint.

Among similar phosphoric acid compounds, inorganic phosphoric acid, phosphates such as zinc phosphate, and other types of phosphoric acids such as organic phosphoric acids exhibit no practical effect of improving adhesion (sea water corrosion resistance) of a fluorine resin paint film (anticorrosive coating) to an aluminum alloy substrate, like general-purpose undercoating treatment such as a chromate treatment, a boehmite treatment or the like.

The organic phosphonic acid is an unsubstituted compound wherein two hydroxyl groups are bonded to the phosphorus atom. Typical of the organic phosphonic acids are methylphosphonic acid ($CH_3P(O)(OH)_2$), ethylphosphonic acid ($C_2H_5P(O)(OH)_2$), vinylphosphonic acid (($C_2H_3P(O)(OH)_2$), octylphosphonic acid (($C_8H_{17}P(O)(OH)_2$), phenylphosphonic acid (($C_6H_5P(O)(OH)_2$), and the like.

From the standpoint of the ease in handling and the superior adhesion-improving effect, it is preferred that the organic phosphonic acid primer film is made of one or more of organic phosphonic acids selected from methylphosphonic acid, ethylphosphonic acid and vinylphosphonic acid.

These organic phosphonic acids have two OH groups, which bond to Al and O of the oxide film ($Al_2O_3$) invariably formed on the surface of an aluminum alloy substrate, respectively. This bond is a covalent bond, which is much stronger than different types of bonds (ionic bond, Van der Waals bond, and hydrogen bond). The hydrocarbon moiety and the C—O moiety of the fluorine resin are subjected to covalent bonding with the organic moiety of the organic phosphonic acid when crosslinked with a curing agent, thereby forming a very strong bond. As a result, the fluorine resin paint film coated on the aluminum alloy substrate is strongly bonded to the alloy substrate through the organic phosphonic primer film, thereby remarkably improving adhesion of the coating film.

The manner of forming the primer film of an organic phosphonic acid is not specifically limited. When the uniformity of primer film formation influencing film adhesion is taken into account, dipping of an aluminum alloy substrate in an organic phosphonic acid aqueous solution is preferable to coating onto the surface of the aluminum alloy substrate.

The organic phosphoric acid primer film is not critical with respect to the thickness thereof. Depending on the manner of forming the coating film, it may be impossible or is unnecessary to form a thick primer film of an organic phosphonic acid in a thickness of the order of μm. Using known film formation techniques, the thickness is at most in the range of several angstroms to several tens of angstroms. A satisfactory adhesion-improving effect is obtained in such a thickness of the primer film as mentioned above.

Uniformity such as in the thickness of a coating film is important rather than the thickness of the organic phosphonic acid primer film. From this point of view, the dipping conditions in an organic phosphonic acid aqueous solution are preferably those indicated below. More particularly, the concentration of an aqueous organic phosphonic acid solution ranges 0.01 to 100 g/liter, the temperature of the aqueous solution ranges from 50 to 100° C., and the dipping time ranges 1 to 120 seconds.

If the concentration of the organic phosphonic acid aqueous solution is too low, the temperature of the aqueous solution is too low or the dipping time is too short, the thickness of the resulting primer film becomes non-uniform, with the high possibility that adhesion of the coating film lowers. On the other hand, if the concentration of the organic phosphonic aqueous solution is too high, the temperature of the aqueous solution is too high and the immersion time is too long, the thickness of the primer film becomes non-uniform, with the high possibility that adhesion of the coating film lowers. Accordingly, the formation of the primer film of an organic phosphonic acid is preferably carried out within such a range of immersion conditions in the organic phosphonic acid aqueous solution as defined above.

(Pretreatment)

In order to form the primer film of an organic phosphonic acid or a fluorine resin paint film while ensuring good adhesion, the aluminum alloy substrate is pretreated after the control of the surface roughness. For the pretreatment, it is preferred not only to merely remove dirt from the surface of the aluminum alloy substrate after the control of the roughness, but also to once remove an oxide and hydroxide formed on the aluminum alloy substrate thereby permitting the surface of the aluminum alloy to be exposed. Typically, the aluminum alloy substrate is degreased or cleaned with a degreasing agent or a cleaning agent, followed by immersion in an alkaline treating solution such as of caustic soda or immersion in an acid aqueous solution such as of nitric acid and rinsing with ion exchanged water.

It will be noted that if a degreasing agent or cleaning agent is used as a liquid for the wet blast process in the course of the roughness control, it may be possible to omit the degreasing and cleaning steps in the pretreatment. In an ordinary pretreatment, a fresh aluminum oxide film is inevitably formed immediately after the pretreatment and the primer film of an organic phosphonic acid is formed on this oxide film.

(Fluorine Resin Paint Film)

The average thickness of the fluorine resin paint film ranges from 1 to 100 μm. If the average thickness of the fluorine resin paint film is too small, the sea water corrosion resistance of the film lowers. In contrast, when the thickness is too great, the high thermal conductivity of aluminum lowers, with the result that heat exchangeability of a heat exchanger to which such an aluminum alloy material is applied lowers. For this reason, it is preferred that the average thickness of the fluorine resin paint film is within such a range as defined above.

The average thickness of the fluorine resin paint film is obtained by subjecting a fluorine resin paint film, which is formed on an aluminum alloy material and well dried, to sectional observation through an optical microscope of about 50 magnifications at appropriate ten sample portions thereof to measure thicknesses thereat and averaging the ten measurements.

It will be noted that in the practice of the invention, no metals (metallic powders) such as zinc, titanium, manganese, aluminum, niobium and the like are contained in a manner as described in the afore-indicated Patent Literature 3. This is because if metals (metallic powders) other than those indicated above are substantially present in the fluorine resin coating film, these metals are oxidized in the film to form oxides, with the high possibility that adhesion degrades.

(Type of Fluorine Resin)

The fluorine resins used for the fluorine resin paint (film) typically include trifluoride resins and tetrafluoride resins. Of these, trifluoride resins are preferred because of higher adhesion to a primer film of an organic phosphonic acid and higher sea water corrosion resistance. The trifluoride resins are also preferred from the standpoint that they are relatively low in odor, soluble in low polar solvents and easy in handling. The trifluoride resins and tetrafluoride resins may consist of monomers or oligomers.

The monomer for trifluoride resin is ethylene trifluoride wherein three hydrogen (H) atoms of ethylene are substituted with fluorine (F) atoms. The monomer or oligomer of a trifluoride resin is one which is obtained by copolymerizing (reacting) ethylene trifluoride with vinyl ether, an acrylic compound, a vinyl ester and/or the like. Likewise, the monomer for tetrafluoride resin is ethylene tetrafluoride wherein four hydrogen (H) atoms of ethylene are all substituted with fluorine (F) atoms. The monomer or oligomer of a trifluoride resin is one which is obtained by copolymerizing (reacting) ethylene tetrafluoride with vinyl ether, an acrylic compound, a vinyl ester and/or the like.

Typical examples of the trifluoride resin include trifluoride types of chlorotrifluoroethylene (CTFE)/vinyl ether copolymers and chlorofluoroethylene/acryl copolymers.

(Fluorine Resin Paint)

The fluoride resin paint of the invention includes one wherein the monomer or oligomer of the trifluoride resin is crosslinked with an isocyanate group (—N=C=O) or a siloxane group by use of an isocyanate or siloxane curing agent.

In the practice of the invention, a fluorine resin paint, which is obtained by crosslinking a chlorotrihfluoroethylene/vinyl ether copolymer, chosen among those trifluoride resins, with a curing agent such as an isocyanate or siloxane, is preferred because of the highest adhesion with the primer film of an organic phosphonic acid and a high sea water corrosion resistance.

The fluoride resin paint of the invention provided as a coating solution onto a surface of an aluminum alloy substrate (or a primer film of an organic phosphonic acid) is prepared by adding such a curing agent as mentioned above to a base material of a monomer or oligomer of a trifluoride resin. For instance, 0.1 to 3 parts of a curing agent is added to 10 to 15 parts of the base resin on a weight basis, to which a thinner is added for dilution, if necessary, to provide a paint.

(Aluminum Alloy Substrate)

The aluminum alloy substrate used is preferably made of an aluminum alloy that is likely to be processed or shaped into a plate for use as a plate heat exchanger. Types of such alloys include 1000, 3000, 5000, 6000, and 7000 series aluminum alloys, which are appropriately used in the form of plates, strips or extrusions. Of these, a 3000 series, e.g. 3003 series, alloy is preferably used.

In view of an excellent sea water corrosion resistance, it is preferred that the heat transfer unit of a plate heat exchange using sea water as cooling water is constituted of an aluminum alloy material, which is obtained by forming a primer film of an organic phosphonic acid on the aluminum alloy substrate whose roughness is controlled as stated hereinbefore, and further forming, on the primer film, a fluorine resin paint film whose average thickness of 1 to 100 mm after drying.

EXAMPLES

Examples of the invention are described.

Test pieces of a series 3003 aluminum alloy plate having a thickness of 1.0 mm and a size of 60 mm×60 mm were subjected to roughness control so that a ten-points average surface roughness Rz was within a range of 0.3 to 5 μm. Next, these test pieces were coated on the surface thereof with a primer film of an organic phosphonic acid and further with a 5 μm thick fluorine resin paint film made of a trifluoride resin to obtain coated aluminum alloy materials. These alloy materials were subjected to evaluation of film adhesion and high-temperature immersion durability. Simultaneously, a coated aluminum alloy material for comparison, in which a ten-points average surface roughness was controlled at 0.2 μm and film formation was made in the same manner as set out above, was also evaluated with respect to the film adhesion and high-temperature immersion durability.

In the invention, the film adhesion durability that is a film life is evaluated as film swelling determined by an immersion test and a maximum pit depth. It will be noted that the corrosion resistance of a fluorine resin paint film per se may be evaluated by measuring a film corrosion resistance with a lapse of time as in the afore-indicated Patent Literature 3. In this connection, however, even if the corrosion resistance of a fluorine resin paint film per se within a time as short as about 5 days is good, such evaluation is meaningless in case where the film adhesion (film adhesion durability) is low and the film is swollen and came off in short or long-time use.

Hence, in the practice of the invention, the film adhesion determined by a long-time immersion test is evaluated as a sea water corrosion resistance. At the same time, a residual rate of film by a cross-cut tape peeling test is evaluated as high-temperature immersion durability.

(Roughness Control)

One surface of an aluminum alloy test pieces was subjected to sand blasting using alumina powder as an abrasive material to provide different roughnesses. The surface roughness was measured by means of a surface tester.

(Pretreatment)

For the pretreatment, dirt, an oxide and a hydroxide formed on the one surface of the aluminum test piece after control of the roughness were once removed thereby exposing the aluminum metal surface. More particularly, while immersing the test piece in acetone, supersonic cleaning of 30 seconds was carried out, followed by rinsing with ion exchanged water.

(Primer Treatment with an Organic Phosphonic Acid)

Vinylphosphonic acid was used as an organic phosphonic acid and diluted with ion exchanged water at 10 g/liter to provide an organic phosphonic acid primer solution. Next, the aluminum alloy test piece after the pretreatment was immersed in the organic phosphonic acid primer solution for 10 seconds, followed by rinsing with ion exchanged water.
(Fluorine Resin Coating)

There was used a paint wherein a chlorotrifluoroethylene/vinyl ether copolymer used as a base resin of trifluoride resin was crosslinked with an isocyanate curing agent. Using a thinner, the paint was diluted at a dilution rate in the range of severalfold to ten and severalfold so that a coating thickness became 5 μm, thereby providing a coating solution. The surface of the aluminum alloy material which had been subjected to the organic phosphonic acid primer treatment was immediately dip-coated with the coating solution as uniformly as possible. It will be noted that the resulting fluorine resin coating film contains no metallic powder and the like.

The respective aluminum alloy materials obtained after the coating were forcedly dried at 100° C. for 2 hours and provided as test pieces for evaluation of film swelling and maximum pit depth.
(Coating Film Thickness)

In order to determine a film thickness of the respective aluminum alloy test pieces obtained after the coating treatment, each film was sectionally observed at arbitrary ten points thereof by means of an optical microscope of 50 magnifications. These coating film thicknesses are also shown in Table 1. It will be noted that the thickness of primer film of the organic phosphonic acid was in the range of 4 angstroms to 17 angstroms on average of every test piece.

Upon the sectional observation of the coating film, it was confirmed that when compared with an aluminum alloy material that was not pretreated, a fresh aluminum oxide film was formed by the pretreatment in place of an original oxide film of aluminum. It was also confirmed that the primer film of the organic phosphonic acid was formed on the oxide film, on which the coating film was further formed.
(Immersion Test)

The test piece of the aluminum alloy material obtained above was immersed in OY water that is usually known as a corrosion accelerating solution to evaluate film swelling and a maximum pit depth. The OY water was prepared by adding, to ion-exchanged water, NaCl, $Na_2SO_4$, $FeCl_3.6H_2O$, and $CuCl_2.2H_2O$ so that the concentrations of $Cl^-$, $SO_4^{2-}$, $Fe^{3+}$ and $Cu^{2+}$ were, respectively, at 195 ppm, 60 ppm, 30 ppm and 1 ppm. The test piece was immersed in this OY water and heated to 50° C.

A cycle where the temperature was kept at 50° C. for 8 hours and the heating was stopped, followed by allowing to stand for 16 hours was repeated over 14 days to obtain a sample for evaluation of the immersion test. Through an appearance inspection of this sample, film swelling was confirmed. The maximum pit depth was determined by removing the film from the sample and applying a focal depth method. The results of the evaluation are shown in Table 1 and the sole FIGURE. The sole FIGURE shows a relation between the surface roughness Rz and the maximum pit depth in Table 1.
(High Temperature Immersion Test)

An aluminum alloy test piece whose roughness was so controlled as set out above was subjected to the same pretreatment, organic phosphonic acid primer treatment and fluorine resin coating as set out above to provide an aluminum alloy test piece after the coating treatment. This test piece was subjected to such a high temperature immersion test as set out below to evaluate durability under the high temperature immersion.

The coated aluminum alloy test piece was placed in an autoclave in which artificial sea water (Aquamarine for metal corrosion test, made by Yashima Co., Ltd.) was charged, followed by heating to 200° C. to make a saturated vapor condition. After 4 weeks, the test piece was removed form the autoclave, washed with water, dried, followed by subjecting to a cross cut tape peeling test. The results are shown in Table 1.

TABLE 1

| | Aluminium alloy substrate | | Hydrogen phosphate salt | | | | Average thickness of coating film (μm) | Immersion test Maximum pit depth (μm) | High temperature immersion test Residual rate of coating film (%) |
|---|---|---|---|---|---|---|---|---|---|
| | Material | 10-point average roughness (μm) | Compound | Temp. (g/liter) | Immersion temp. (° C.) | Immersion Time (sec) | | | |
| Example 1 | 3003 | 0.3 | Vinyl-phosphonic acid | 10 | 65 | 10 | 5 | 40 | 10 |
| Example 2 | 3003 | 0.5 | Vinyl-phosphonic acid | 10 | 65 | 10 | 5 | 55 | 38 |
| Example 3 | 3003 | 1.0 | Vinyl-phosphonic acid | 10 | 65 | 10 | 5 | 63 | 95 |
| Example 4 | 3003 | 2.0 | Vinyl-phosphonic acid | 10 | 65 | 10 | 5 | 81 | 100 |
| Example 5 | 3003 | 5.0 | Vinyl-phosphonic acid | 10 | 65 | 10 | 5 | 77 | 100 |
| Comp. Ex. 1 | 3003 | 0.2 | Vinyl-phosphonic acid | 10 | 65 | 10 | 5 | 220 | 9 |

As will be apparent from Table 1, the substrate surfaces of the aluminum alloy test pieces of Examples 1 to 5, respectively, have 10-point average surface roughnesses Rz controlled to 0.3 μm or over. This eventually leads to a maximum pit depth falling within 90 μm or below when determined by the immersion test using the OY water.

Although these results do not guarantee a semi-permanent film life when applied to a plate heat exchanger using actual sea water as cooling water, it will be apparent that the examples are more excellent in film adhesion in long-term use than the comparative example discussed below.

In Comparative Example 1 wherein the ten-points average surface roughness of the test piece substrate is at 0.2 μm, the maximum pit depth Rz arrives at 220 μm. This is considered as follows: because of the inadequate control of the surface roughness of the test piece substrate, film adhesion (durability of film adhesion) becomes poor, so that the film swells to cause film separation, thereby permitting corrosion to proceed in the substrate surface.

More particularly, as shown in the sole FIGURE, when the ten-points average surface roughness Rz of the aluminum alloy substrate is less than 0.3 μm, film swelling occurs and thus, separation from the aluminum alloy substrate rapidly proceeds, with the result that corrosion proceeds in the substrate surface to make a great pit depth. On the other hand, when the ten-points average surface roughness Rz is at 0.3 μm or over, the separation from the aluminum alloy substrate as a result of the film swelling is suppressed, and the pit depth in the substrate surface is fallen within a small range.

From these results, it will be seen that the structure of the invention including an aluminum alloy substrate whose ten-points average surface roughness Rz is controlled at 0.3 μm or over, an organic phosphonic acid primer film formed on the substrate and a fluorine resin paint film having a dry average thickness of 1 to 100 μm has a critical meaning with respect to sea water corrosion resistance.

On the other hand, with Examples 3 to 5 wherein the ten-points average surface roughness Rz is controlled at 1.0 μm or over, the residual rate of film is kept at 95% or over in the cross cut tape peeling test. In contrast, the residual rates of the films in Examples 1 and 2 wherein the ten-points average surface roughness is less than 1.0 μm have been found to be at 38% or below.

Thus, these results reveal that the structure of the invention including an aluminum alloy substrate whose ten-points average surface roughness Rz is controlled at 1.0 μm or over, an organic phosphonic acid primer film formed on the substrate and a fluorine resin paint film having a dry average thickness of 1 to 100 μm has a critical meaning with respect to the durability at the time of high temperature immersion.

As stated hereinabove, according to the aluminum alloy material of the invention having an excellent sea water corrosion resistance, the alloy material has, on a surface of an aluminum alloy substrate whose ten-points average surface roughness Rz is controlled at 0.3 μm or over, an organic phosphonic primer film and a fluorine resin paint film formed on the primer film and having a dry average thickness of 1 to 100 μm, so that film separation ascribed to the film swelling can be suppressed, thereby obtaining an aluminum alloy material having an excellent sea water corrosion resistance.

Furthermore, the aluminum alloy material of the invention has, on a surface of an aluminum alloy substrate whose ten-points average surface roughness Rz is controlled at 1.0 μm or over, an organic phosphonic primer film and a fluorine resin paint film formed on the primer film and having a dry average thickness of 1 to 100 μm, so that film separation at the time of high temperature immersion can be suppressed, thereby obtaining an aluminum alloy material having excellent durability against sea water.

According to the invention, there can be provided an aluminum alloy material having good adhesion of a trifluoride resin anticorrosive (sea water corrosion resistance) film thereto and a plate heat exchanger using the aluminum alloy material in a heat transfer unit using sea water as cooling water. The plate heat exchanger provided with such an aluminum alloy material as in the present invention is usable over a long time in a maintenance-free condition.

What is claimed is:

1. An aluminum alloy material, comprising an aluminum alloy substrate wherein a ten-points average surface roughness Rz, which is an average roughness of five greatest peak-to-valley separations on a surface of the aluminum alloy substrate, is 0.3 μm or over, an organic phosphonic primer film formed on the surface of said aluminum alloy substrate, and a fluorine resin paint film formed on said primer film and having a dry average thickness of 1 to 100 μm.

2. The aluminum alloy material according to claim 1, wherein the ten-points average surface roughness is controlled at 1.0 μm or over.

3. The aluminum alloy material according to claim 1, wherein a fluorine resin for said fluorine resin paint film is made of a trifluoride resin.

4. The aluminum alloy material according to claim 3, wherein said trifluoride resin is made of a chlorotrifluoroethylene/vinyl ether copolymer, wherein said chlorotrifluoroethylene/vinyl ether copolymer is crosslinked with an isocyanate in the fluorine resin paint.

5. The aluminum alloy material according to claim 1, wherein said aluminum alloy substrate has a 3000 series alloy defined in JIS or AA standards.

6. A plate heat exchanger, comprising a heat transfer unit using sea water as cooling water, wherein said heat transfer unit being made of an aluminum alloy material according to claim 1.

7. The aluminum alloy material according to claim 1, wherein the organic phosphonic acid is an unsubstituted compound wherein two hydroxyl groups are bonded to a phosphorus atom.

8. The aluminum alloy material according to claim 7, wherein the organic phosphonic acid is methylphosphonic acid ($CH_3P(O)(OH)_2$), ethylphosphonic acid ($C_2H_5P(O)(OH)_2$), vinylphosphonic acid ($C_2H_3P(O)(OH)_2$), octylphosphonic acid (($C_8H_{17}P(O)(OH)_2$), or phenylphosphonic acid (($C_6H_5P(O)(OH)_2$).

9. The aluminum alloy material according to claim 1, wherein the aluminum alloy is one of 3003 series aluminum alloys.

10. The aluminum alloy material according to claim 1, wherein the ten-points average surface roughness is 0.3 μm or over and less than 5 μm.

* * * * *